US012018807B2

(12) United States Patent
Lu

(10) Patent No.: US 12,018,807 B2
(45) Date of Patent: Jun. 25, 2024

(54) AUTOMOTIVE LIGHTING SYSTEM

(71) Applicant: LUMILEDS LLC, San Jose, CA (US)

(72) Inventor: Kang Lu, Shanghai (CN)

(73) Assignee: Lumileds, LLC, San Jose, CA (US)

( * ) Notice: Subject to any disclaimer, the term of this patent is extended or adjusted under 35 U.S.C. 154(b) by 0 days.

(21) Appl. No.: 18/018,828

(22) PCT Filed: Jul. 30, 2021

(86) PCT No.: PCT/US2021/044038
§ 371 (c)(1),
(2) Date: Jan. 30, 2023

(87) PCT Pub. No.: WO2022/026911
PCT Pub. Date: Feb. 3, 2022

(65) Prior Publication Data
US 2023/0296219 A1 Sep. 21, 2023

(30) Foreign Application Priority Data
Aug. 25, 2020 (EP) ..................................... 20192564

(51) Int. Cl.
*F21S 41/25* (2018.01)
*F21S 41/153* (2018.01)

(52) U.S. Cl.
CPC ............. *F21S 41/25* (2018.01); *F21S 41/153* (2018.01)

(58) Field of Classification Search
CPC ................ F21S 41/141-153; F21S 41/24-285
See application file for complete search history.

(56) References Cited

U.S. PATENT DOCUMENTS

| | | | |
|---|---|---|---|
| 10,228,108 B2 | 3/2019 | Courcier et al. | |
| 10,337,684 B2 | 7/2019 | Joerg et al. | |
| 10,845,026 B2 * | 11/2020 | Engelen | G02B 3/0056 |
| 2011/0038168 A1 | 2/2011 | Schug | |
| 2019/0234572 A1 | 8/2019 | Courcier | |

FOREIGN PATENT DOCUMENTS

| | | |
|---|---|---|
| DE | 10062105 A1 | 6/2002 |
| DE | 102009053581 B3 | 3/2011 |
| EP | 2743567 A1 | 6/2014 |

(Continued)

OTHER PUBLICATIONS

International Preliminary Report on Patentability Chapter I dated Jan. 31, 2023 for PCT International Application No. PCT/US2021/044038.

(Continued)

*Primary Examiner* — Jason M Han
(74) *Attorney, Agent, or Firm* — Volpe Koenig

(57) ABSTRACT

An automotive lighting system for a vehicle includes a light source, a refraction lens and a projection lens. The light source includes a first sub light source. The refraction lens includes a light entrance surface and a light exit surface. The light entrance surface has a first protrusion that has a first light entrance face adjacent the first sub light source and a first light exit face on the light entrance surface of the first refraction lens. The first protrusion is located at a periphery of the light entrance surface of the refraction lens with respect to an optical axis of the automotive lighting system.

7 Claims, 8 Drawing Sheets

(56) References Cited

FOREIGN PATENT DOCUMENTS

| | | | |
|---|---|---|---|
| GB | 2412159 | A | 9/2005 |
| JP | 2017-195159 | A | 10/2017 |
| KR | 10-1959799 | B1 | 3/2019 |
| KR | 2019-0032069 | A | 3/2019 |
| WO | 2020/083711 | A1 | 4/2020 |

OTHER PUBLICATIONS

Extended European Search Report dated Jan. 13, 2021 for European Patent Application No. 20192564.1.

International Search Report and Written Opinion dated Nov. 15, 2021 for PCT International Application No. PCT/US2021/044038.

* cited by examiner

AUTOMOTIVE LIGHTING SYSTEM

CROSS REFERENCE TO RELATED APPLICATIONS

This application is a § 371 application of International Application No. PCT/US2021/044038, filed Jul. 30, 2021, which claims the benefit of PCT Application No. PCT/CN2020/105675, which was filed on Jul. 30, 2020, and European Patent Application No. 20192565.1, which was filed on Aug. 25, 2020, the contents of which are hereby incorporated by reference herein.

BACKGROUND

Light Emitting Diodes (LEDs) are rapidly gaining popularity because of their longevity and low energy credentials. Advances in manufacturing have led to the emergence of chip-sized LED packages or modules in which a plurality of LEDs is packaged together, like a matrix, comprising one or more rows of LEDs.

SUMMARY

An automotive lighting system for a vehicle includes a light source, a refraction lens and a projection lens. The light source includes a first sub light source. The refraction lens includes a light entrance surface and a light exit surface. The light entrance surface has a first protrusion that has a first light entrance face adjacent the first sub light source and a first light exit face on the light entrance surface of the first refraction lens. The first protrusion is located at a periphery of the light entrance surface of the refraction lens with respect to an optical axis of the automotive lighting system.

BRIEF DESCRIPTION OF THE DRAWINGS

A more detailed understanding can be had from the following description, given by way of example in conjunction with the accompanying drawings wherein.

DETAILED DESCRIPTION

Figure 1:
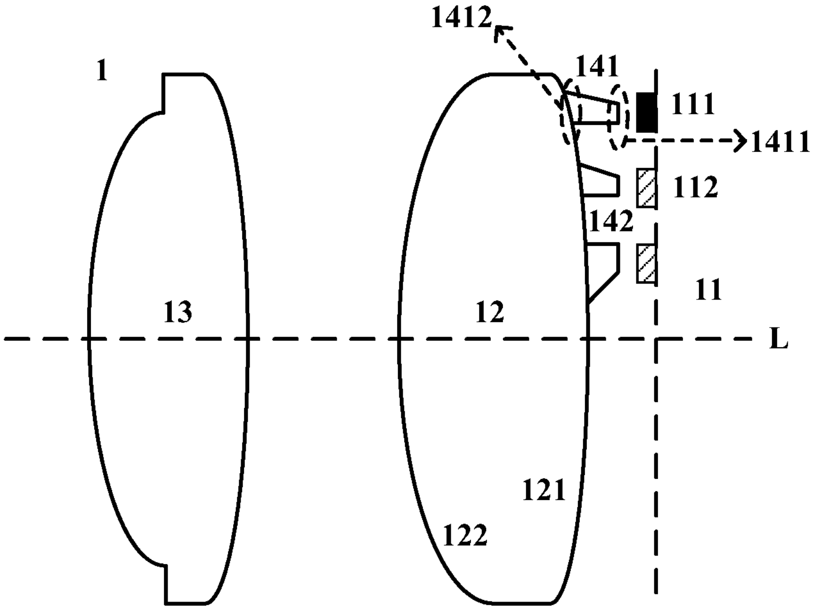
FIG. 1 is a diagram of an automotive lighting system such as for use in a vehicle.

Examples of different light illumination systems and/or light emitting diode ("LED") implementations will be described more fully hereinafterwith reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

Semiconductor light emitting devices (LEDs) or optical power emitting devices, such as devices that emit ultraviolet (UV) or infrared (IR) optical power, are among the most efficient light sources currently available. These devices (hereinafter "LEDs"), may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required.

LEDs may be arranged into arrays for some applications. For example, LED arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive overtime and/or environmentally responsive. LED arrays may provide pre-programmed light distribution in various intensity, spatial or temporal patterns. The emitted light may be based at least in part on received sensor data and may be used for optical wireless communications. Associated electronics and optics may be distinct at an emitter, emitter block or device level.

LED arrays may be formed from one, two or three dimensional arrays of LEDs, VCSELs, OLEDs, or other controllable light emitting systems. LED arrays may be formed as emitter arrays on a monolithic substrate, formed by partial or complete segmentation of a substrate, formed using photolithographic, additive, or subtractive processing, or formed through assembly using pick and place or other suitable mechanical placement. LED arrays may be uniformly laid out in a grid pattern, or, alternatively, may be positioned to define geometric structures, curves, random, or irregular layouts.

Figure 5:
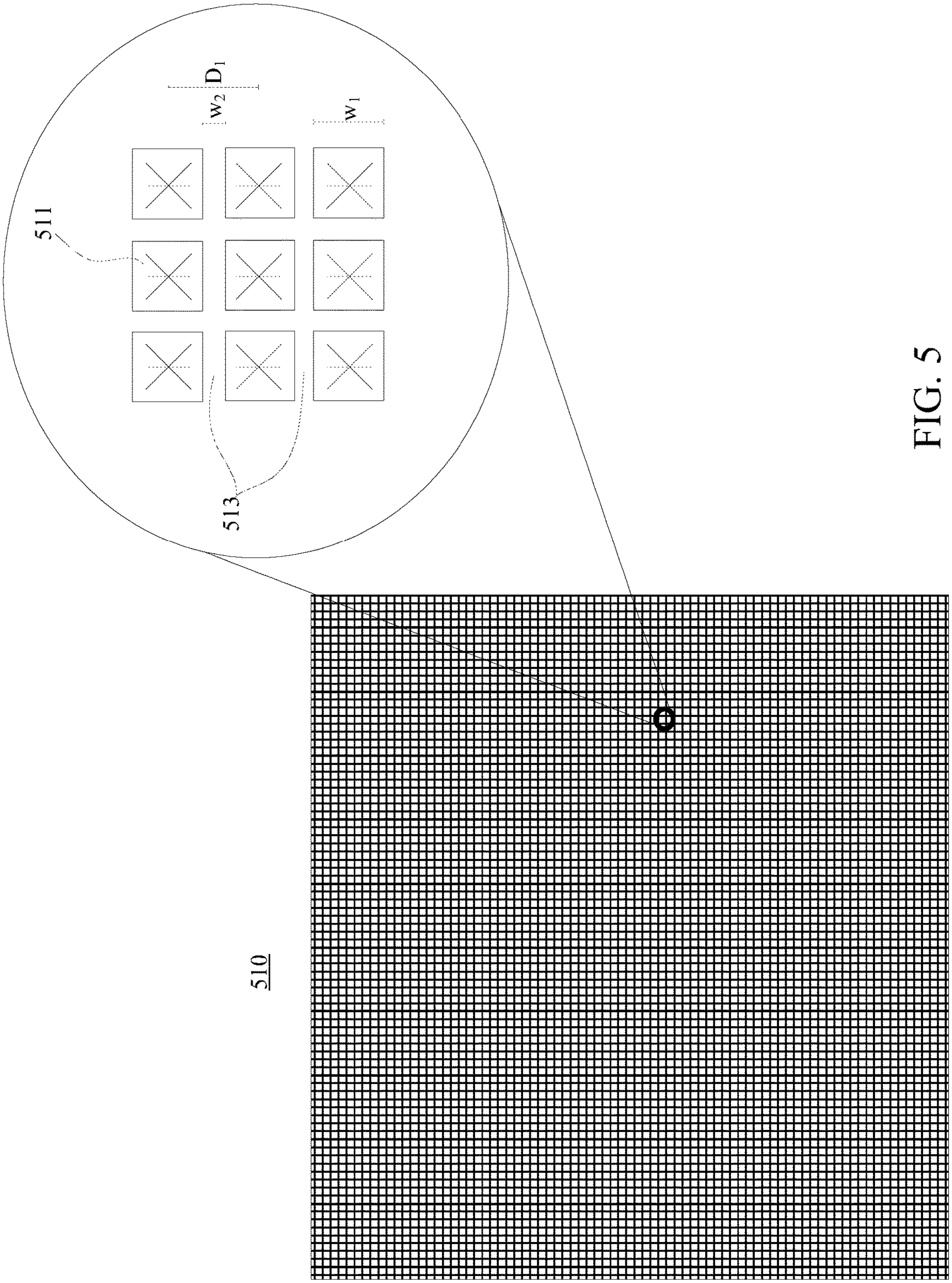
FIG. 5 is a top view of an example LED array.

FIG. 5 is a top view of an example LED array 510. In the example illustrated in FIG. 5, the LED array 510 is an array of emitters 511. Emitters 511 in the LED array 510 may be individually addressable or may be addressable in groups/subsets.

An exploded view of a 3×3 portion of the LED array 510 is also shown in FIG. 5. As shown in the 3×3 portion exploded view, the LED array 510 may include emitters 511 that each have a width $w_1$. In embodiments, the width $w_1$ may be approximately 100 μm or less (e.g., 40 μm). Lanes 513 between the emitters 511 may be a width, $w_2$, wide. In embodiments, the width $w_2$ may be approximately 20 μm or less (e.g., 5 μm). In some embodiments, the width $w_2$ may be as small as 1 μm. The lanes 513 may provide an air gap between adjacent emitters or may contain other material. A distance di from the center of one emitter 511 to the center of an adjacent emitter 511 may be approximately 120 μm or less (e.g., 45 μm). It will be understood that the widths and distances provided herein are examples only and that actual widths and/or dimensions may vary.

It will be understood that, although rectangular emitters arranged in a symmetric matrix are shown in FIG. 5, emitters of any shape and arrangement may be applied to the embodiments described herein. For example, the LED array 510 of FIG. 5 may include over 20,000 emitters in any applicable arrangement, such as a 200×100 matrix, a symmetric matrix, a non-symmetric matrix, or the like. It will also be understood that multiple sets of emitters, matrixes, and/or boards may be arranged in any applicable format to implement the embodiments described herein.

As mentioned above, LED arrays, such as the LED array 510, may include up to 20,000 or more emitters. Such arrays may have a surface area of 90 $mm^2$ or greater and may require significant power to power them, such as 60 watts or more. An LED array such as this may be referred to as a micro LED array or simply a micro LED. In some embodiments, micro LEDs may include hundreds, thousands or even millions of LEDs or emitters positioned together on centimeter scale area substrates or smaller. A micro LED may include an array of individual emitters provided on a substrate or may be a single silicon wafer or die partially or fully divided into segments that form the emitters.

A controller may be coupled to selectively power subgroups of emitters in an LED array to provide different light beam patterns. At least some of the emitters in the LED array may be individually controlled through connected electrical traces. In other embodiments, groups or subgroups of emitters may be controlled together. In some embodiments, the emitters may have distinct non-white colors. For example, at least four of the emitters may be RGBY groupings of emitters.

LED array luminaires may include light fixtures, which may be programmed to project different lighting patterns based on selective emitter activation and intensity control. Such luminaires may deliver multiple controllable beam patterns from a single lighting device using no moving parts. Typically, this is done by adjusting the brightness of individual LEDs in a 1D or 2D array. Optics, whether shared or individual, may optionally direct the light onto specific target areas. In some embodiments, the height of the LEDs, their supporting substrate and electrical traces, and associated micro-optics may be less than 5 millimeters.

Vehicle headlamps are an LED array application that may require a large number of pixels and a high data refresh rate. Automotive headlights that actively illuminate only selected sections of a roadway may be used to reduce problems associated with glare or dazzling of oncoming drivers. Using infrared cameras as sensors, LED arrays may activate only those emitters needed to illuminate the roadway while deactivating emitters that may dazzle pedestrians or drivers of oncoming vehicles. In addition, off-road pedestrians, animals, or signs may be selectively illuminated to improve driver environmental awareness. If emitters are spectrally distinct, the color temperature of the light may be adjusted according to respective daylight, twilight, or night conditions. Some emitters may be used for optical wireless vehicle to vehicle communication.

Such LED packages or modules typically produce a Lambertian luminous distribution centered about an optical axis of the package or module. In many headlamps and other lighting devices comprising such LED packages or modules, a lens may be used to image a light distribution or a light pattern generated by the light source (e.g., an LED matrix) into the far field. In this case, due to a curvature in the light entrance surface of the lens, LEDs or pixels of the light source located at a periphery of the lens may be spaced apart by a larger distance from the respective in-coupling portions of the light entrance surface of the lens as compared with those LEDs or pixels of the light source located at a center of the lens. This may result in a very large loss of light or an extremely low efficiency of light in-coupling at least at the edges of the lens.

Figure 6A:
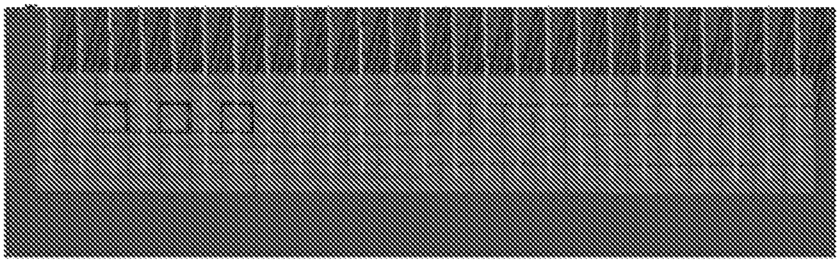
FIGS. 6A, 6B and 6C are images showing a light output of an example matrix LED array.
Figure 6B:
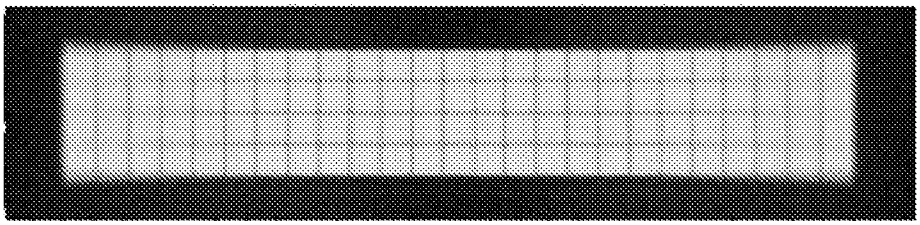
Figure 6C:
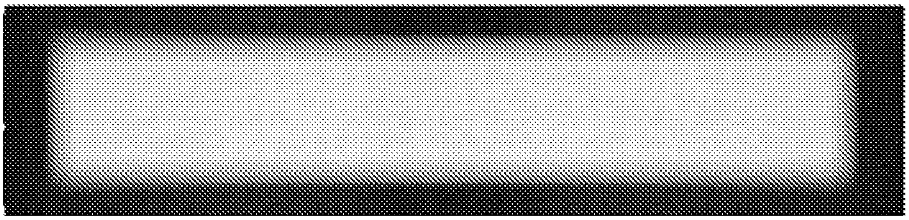

FIGS. 6A, 6B and 6C are images showing a light output of an example matrix LED array. In FIG. 6A, the light output from a 4×25 matrix array without use of optics is shown. In FIG. 6B, the light output from the 4×25 matrix array with use of a 3-4 part lens system is shown. In FIG. 6C, a uniform light distribution for a 4×25 matrix array is shown. As can be seen in FIGS. 6A, 6B and 6C, in many headlamps and other lighting devices comprising such LED packages or modules, any inhomogeneity or intensity structure produced by the light source may be projected and reproduced in the far field. In matrix systems in particular, gaps between the individual LEDs or pixels of the light source may be undesirably imaged as black lines in the far field. Embodiments described herein provide for an automotive lighting system, which may have improved performance assessed at least based on illumination homogeneity and efficiency of light in-coupling.

FIG. 1 is a diagram of an automotive lighting system 1 such as for use in a vehicle. In the example illustrated in FIG. 1, the automotive lighting system 1 comprises a light source 11, a first lens (e.g., a refractive lens) 12 and a second lens (e.g., a projection lens) 13. The light source 11 may be a matrix array and may comprise at least a first sub light source 111, such as an LED. In some embodiments, the first sub light source 111 may be located at an off-axis position with respect to the optical axis L of the automotive lighting system 1, such as close to an upper edge of the first lens 12.

The first lens 12 may have a light entrance surface 121 and a light exit surface 122. A first protrusion 141 may further be provided on the light entrance surface 121 of the first lens 12, such as at a periphery thereof. For example, the first protrusion may be located at a periphery of the light entrance surface of the first lens with respect to an optical axis of the automotive lighting system. For example, if the first lens is shaped to have a circular contour and the optical axis passes through the first lens at the circle's center, the first protrusion can be disposed at the circumference of such a circular first lens.

In the example illustrated in FIG. 1, the first protrusion 141 is located at an upper edge of the light entrance surface 121 of the first lens 12. In this way, light emitted by the light source 11, such as by the first sub light source 111, may be incident on the first protrusion 141 before entering the first lens 12 at an optically downstream position. The first protrusion 141 may have a first light entrance face 1411 and a first light exit face 1412, where light from the first sub light source 111 may be incident firstly onto the first light entrance face 1411 and may be refracted thereby and get inside the first protrusion 141. Light may undergo several times of total internal reflection while propagating within the first protrusion 141 and get refracted out at the first light exit face 1412 of the first protrusion 141, thereby entering the first lens 12.

As can be seen from FIG. 1, in the automotive lighting system 1, light emitted from the light source 11, for example from the first sub light source 111, may only be incident into the first lens 12 after passing through the first protrusion 141, which may be positioned ahead in the optical path. In this way, as compared with a case where no protrusion is deployed, the in-coupling surface for the light from the first sub light source 111 may be moved forwards in an optically upstream direction, such as from the light entrance surface 121 of the first lens 12 to the first light entrance face 1411 of the first protrusion 141. This forward moving of the in-coupling surface may compensate the larger distance at the edge of the first lens 12 that may otherwise exist between the first sub light source 111 and the light entrance surface 121 of the first lens 12 if no protrusion is provided (e.g., due to a curvature in the light entrance surface 121 of the first lens 12, such as a convex curvature in the optically upstream direction). This may help to increase the efficiency of light in-coupling from the light source 11 into the first lens 12, and to reduce the light loss at the edge of the first lens 12. In some embodiments, a maximum efficiency of light in-coupling can be obtained if the first light exit face 1412 of the first protrusion 141 is chosen to be 1 to 4 times larger than the first light entrance face 1411 of the first protrusion 141.

In some embodiments, the light entrance face 121 of the first lens 12 may include a plurality of first protrusions 141, which may be, for example, equally spaced along a periphery of the light entrance surface 121 of the first lens 12, so as to increase the efficiency of light in-coupling and accordingly reduce the light loss at the edges of the automotive lighting system 1. Under the help of the second lens 13, light from the light source 11 (such as from the first sub light source 111) may be projected onto a road in front of the vehicle after passing through the first protrusion 141 and the first lens 12. In embodiments, the second lens 13, located at an optically last position in the automotive lighting system 1, may be a projection lens.

In some embodiments, the light source 11 may also include one or more second sub light sources 112, such as two LEDs in the drawing. In this case, as an example, the first sub light source 111 and the second sub light sources 112 can be distributed in an array, such as in a column perpendicular to the optical axis L of the automotive lighting system 1. Correspondingly, the light entrance surface 121 of the first lens 12 may include one or more second protrusions 142, where each of the second protrusions 142 may be configured to receive light from a respective second sub light source 112. As illustrated in FIG. 1, in a direction perpendicular to the optical axis L of the automotive lighting system 1, each second protrusion 142 may be deployed at a same position as its respective second sub light source 112, which may ensure a larger efficiency of light in-coupling from each second sub light source 112 into the respective second protrusion 142 and give a minimum loss of light across the whole light entrance surface 121 of the first lens 12. Again, as similar to the first protrusion, by setting the left light exit face of the second protrusion 142 to be 1 to 4 times larger than the right light entrance face of the second protrusion 142, a maximum efficiency of light in-coupling can be obtained from the second sub light source 112 into the respective second protrusion 142.

It should be noted that the number of first light sources 111 and the number of second light sources 112 are provided merely as examples to help illustrate the light source 11 schematically, and should not be deemed to limit the present invention only thereto. In other words, the number of the first light sources 111 or the second light sources 112 can be any other numbers as well, distributed for example in an array perpendicular to the optical axis L of the automotive lighting system 1. Correspondingly, the respective first and second protrusions 141, 142 can be provided across the light entrance surface 121 of the first lens 12 in a similar array distribution.

By providing an array distribution of multiple sub light sources (including the first and second sub light sources) and the respective protrusions (including the first and second protrusions), a matrix light pattern (such as a matrix high beam light pattern, where the light source acts to emit a high beam) can be provided by the automotive lighting systems described herein, where each pair of sub light source and its respective protrusion acts as a matrix pixel. This may at least enable such a possibility that the final light pattern as projected in front of the vehicle by the second lens may be provided with a desired form or shape, for example by turning on only a few pairs of sub light source and protrusion, but leaving the rest of them turned off.

Figure 2:
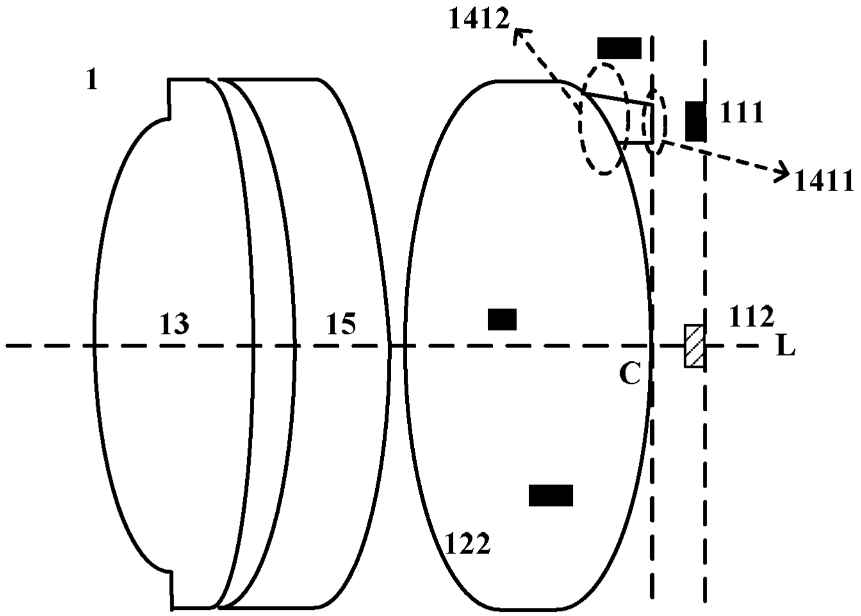
FIG. 2 is a diagram of another automotive lighting system.

FIG. 2 is a diagram of another automotive lighting system 1. Most of the components in the automotive lighting system 1 of FIG. 2 are the same as in the automotive lighting system 1 of FIG. 1, and thus the same reference numbers are used to indicate the same elements. Differences between the automotive lighting systems 1 of FIG. 1 and FIG. 2 are described below.

On one hand, in the automotive lighting system 1 of FIG. 2, the system 1 includes a third lens 15, such as at an optically midway position between the first lens 12 and the second lens 13. The third lens 15 may be configured to receive light from the first lens 12 and redirect it onto the second lens 13. With the incorporation of the third lens 15, more flexibility can be provided, for example, in shaping of the light beam as projected finally by the automotive lighting system 1 in front of the vehicle. Having benefited from the teaching of the descriptions herein, those skilled in the art shall easily think of different shapes and/or configurations that are suitable for the third lens 15 and all these implementations should be encompassed within the scope of the embodiments described herein.

On the other hand, as shown in the automotive lighting system 1 of FIG. 2, the light entrance surface 121 of the first lens 12 may be symmetrically convex in the optically upstream direction, for example having its center C located at the optical axis L of the automotive lighting system 1. Furthermore, as seen in FIG. 2, in a direction parallel to the optical axis L of the automotive lighting system (i.e., the horizontal direction in the drawing), the first light entrance face 1411 of the first protrusion 141 may be located at the same position as the center C of the light entrance surface 121 of the first lens 12. This may mean that the first light entrance face 1411 of the first protrusion 141 is spaced apart from the respective first sub light source 111 by such a distance that equals the one between the center C of the light entrance surface 121 of the first lens 12 and the respective second sub light source 112 located at the optical axis L of the automotive lighting system 1. This kind of flush-positioned configuration between the center C of the light entrance surface 121 of the first lens 12 and the first light entrance face 1411 of the first protrusion 141 may be helpful to keep the efficiency of light in-coupling to be uniform across the light entrance surface 121 of the first lens 12, and thus beneficial for obtaining a uniform intensity distribution in the final light pattern projected in front of the vehicle. In a similar consideration, the flush-positioned configuration as mentioned above may apply as well between the center C of the light entrance surface 121 of the first lens 12 and the light entrance face of the second protrusion 142, and no detailed explanation will be repeated herein for the sake of conciseness.

Figure 8:
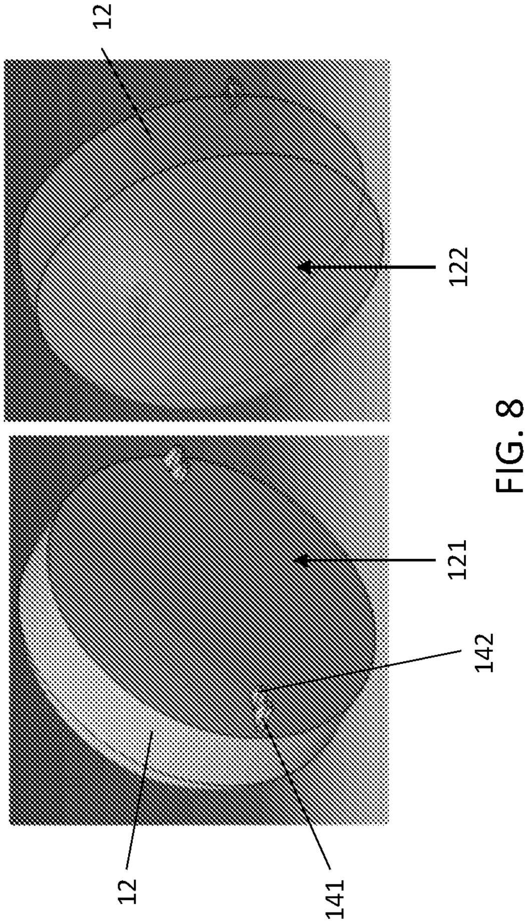
FIG. 8 is a three-dimensional diagram of an example of the first lens showing the light entrance surface with first and second protrusions and as well as the light exit surface.
Figure 9B:
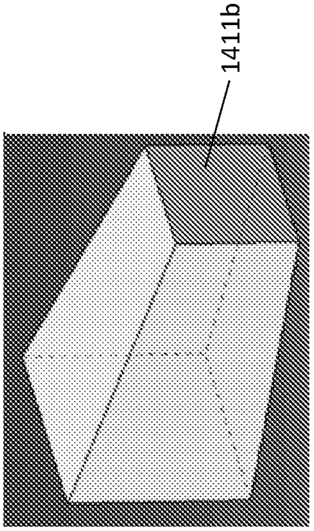
FIGS. 9A and 9B are diagrams of examples of different potential shapes for the first and second protrusions.
Figure 9A:
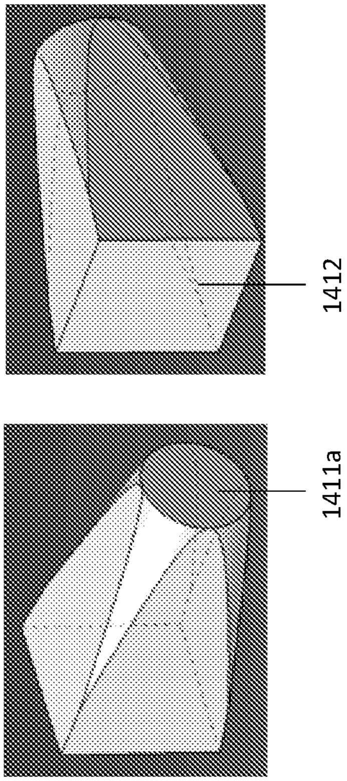

FIG. 8 is a three-dimensional diagram of an example of the first lens 1 showing the light entrance surface 121 with first and second protrusions 141 and 142 as well as the light exit surface 122. FIGS. 9A and 9B are diagrams of examples of different potential shapes for the first and second protrusions. In FIG. 9A, for example, the light entrance face 1411*a* has a circular shape while the light exist face 1412 has a square shape. In FIG. 9B, for another example, both the light entrance face 1411*b* and the light exist face (not labeled) have square shapes. In some embodiments, at least one of the first light entrance face of the first protrusion and the second light entrance face of the second protrusion have a rectangle, round, triangle or polygon contour.

According to some embodiments, at least one of the first light exit face of the first protrusion and the second light exit face of the second protrusion may have a rectangle or trapezoidal contour. It should be noted herein that all the above contours listed with regard to the light entrance or exit face of the first or second protrusion are merely provided for the purpose of illustrating the present invention, and should not be deemed as a limitation or restriction to it. Having benefited from the teaching of the present invention, a skilled person in the art shall easily think of any other shapes or contours applicable to the light entrance or exit face of the two protrusions, and all these alternatives shall be encompassed within the scope of the present invention.

According to some embodiments, the first protrusion may have a curved side face being contiguous to the first light entrance face at one end and to the first light exit face at the other end. For example, the first protrusion can be provided with a cylindrical side surface. A similar configuration may apply to the second protrusion as well (e.g., the second protrusion may have a curved side face being contiguous to the second light entrance face at one end and to the second light exit face at the other end). Thus, for example, the second protrusion may also have a cylindrical side surface.

According to some embodiments, the first protrusion may have more than two flat side faces each being contiguous to the first light entrance face at one end and to the first light exit face at the other end. As an example, the first protrusion can be provided with a prismatic side surface. A similar configuration may apply to the second protrusion as well (e.g., the second protrusion may have more than two flat side faces each being contiguous to the second light entrance face at one end and to the second light exit face at the other end). In this case, for example, the second protrusion may also have a prismatic side surface. In one example, at least one of the flat side faces of the first or second protrusion may enclose an acute angle with respect to the light entrance surface of the first lens, thus helping to ensure the partial overlapping between the light exit faces of the two protrusions.

It should be noted that different configurations may be utilized for the automotive lighting system in the above two aspects of the present invention, where the first one may involve only a periphery position of at least one protrusion on the light entrance surface of the first lens and the second one may involve only a partial overlapping between light exit faces of two protrusions. This may provide a possibility that the two configurations can be used respectively in two separate automotive lighting systems. However, this way of separate description shall not be deemed to be limiting only to these cases (e.g., using two configurations of the automotive lighting system independently). As a matter of fact, the embodiments described herein can be combined as well into one single automotive lighting system.

Figure 3:
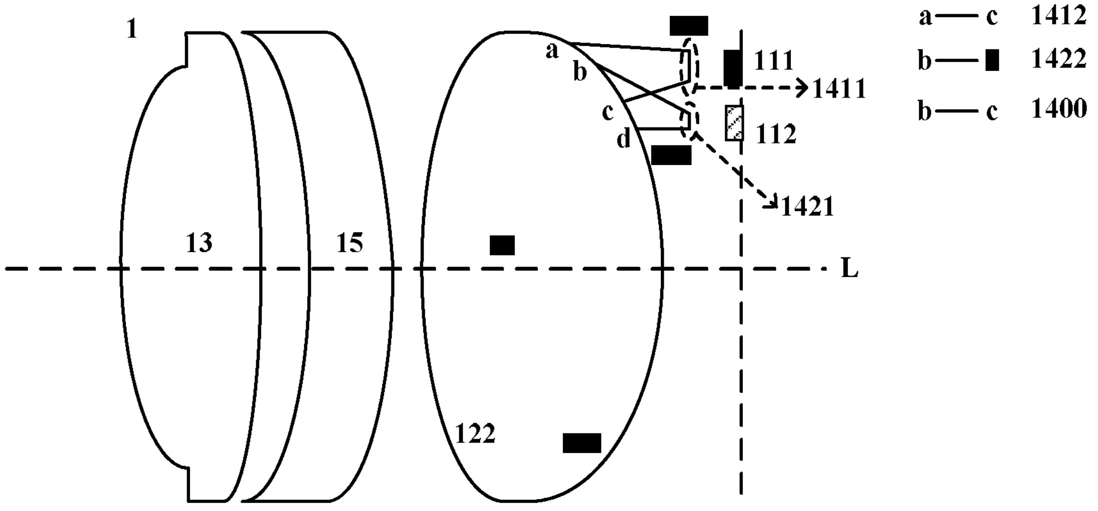
FIG. 3 is a diagram of another automotive lighting system.

FIG. 3 is a diagram of another automotive lighting system 1. Most of the components in the automotive lighting system 1 of FIG. 3 are the same as in the automotive lighting system 1 of FIG. 1, and thus the same reference numbers are used to indicate the same elements, such as the first protrusion 141 at a periphery of the light entrance surface 121 of the first lens 12. Differences between the automotive lighting systems 1 of FIG. 1 and FIG. 3 are described below.

On one hand, in the automotive lighting system 1 of FIG. 3, a third lens 15 is provided, such as at an optically midway position between the first lens 12 and the second lens 13. As similar to the description above regarding FIG. 2, the third lens 15 in the automotive lighting system 1 of FIG. 3 is configured as well to receive light from the first lens 12 and redirect it onto the second lens 13, thus enabling greater flexibility in for example beam shaping of the final light pattern projected in front of the vehicle.

On the other hand, in the automotive lighting system 1 of FIG. 3, the two adjacent protrusions, the first protrusion 141 and the second protrusion 142, may be closely positioned such that there is a partial overlapping between light exit faces thereof. This can be seen more clearly in FIGS. 7A, 7B, 7C and 7D.

Figure 7A:
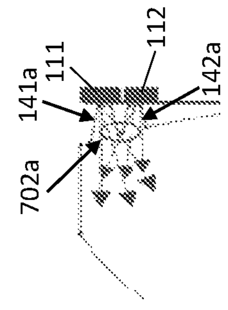
FIG. 7A is a diagram showing a first protrusion and a second protrusion, each of which have light exist surfaces that are spaced apart by a very small amount.

FIG. 7A is a diagram showing a first protrusion 141*a* and a second protrusion 142*a*, each of which have light exit surfaces that are spaced apart by a very small amount (shown in the circle 702*a*). As can be seen in FIG. 7A, the path of the light beams, illustrated by the arrowed lines passing through the light exist surfaces of the first and second protrusions 141*a* and 142*a*, overlap at least partially.

Figure 7B:
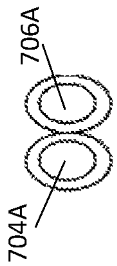
FIG. 7B is a diagram showing light emission by the respective two sub light sources and after passing through the optics.

FIG. 7B is a diagram showing light emission by the respective two sub light sources 111 and 112 after passing through the optics. As can be seen, the two pixels 704A and 706A are closely spaced, but there is still a visible boundary between the two pixels.

Figure 7C:
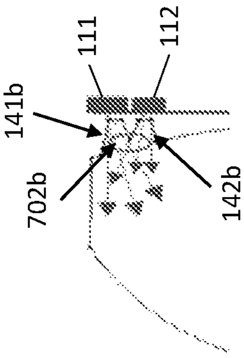
FIG. 7C is a diagram showing a first protrusion and a second protrusion, each of which have light exit surfaces that overlap.

FIG. 7C is a diagram showing a first protrusion 141*b* and a second protrusion 142*b*, each of which have light exit surfaces that overlap (e.g., there is no space between the light exit surfaces of the first and second protrusions 141*b* and 142*b*). In embodiments, this could be done by providing a single body having a common base area with the first and second protrusions protruding therefrom. As can be seen in FIG. 7C, if you extend the inner and outer surfaces of each of the protrusions down into the base area, the light exit surfaces of each of the first and second protrusions overlap in the area within the circle 702*b*. As in FIG. 7A, the light beams emitted through the light exist surfaces of the first and second protrusions 141*b* and 142*b* overlap at least somewhat on entry into the first lens 12.

Figure 7D:
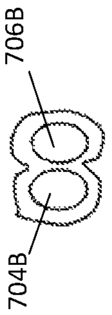
FIG. 7D is diagram showing light emission by two sub light sources are passing through the optics.

FIG. 7D is a diagram showing light emission by the respective two sub light sources 111 and 112 after passing through the optics. As can be seen, the two pixels 704B and 706B are more closely spaced than in FIG. 7B with no clearly defined boundary between the two pixels.

As similar to the above description with respect to FIG. 1, the first protrusion 141 in the automotive lighting system 1 of FIG. 3 comprises a first light entrance face 1411 and a first light exit face 1412 as well. In a similar way, the second protrusion 142 also comprises a second light entrance face 1421 and a second light exit face 1422. As to the partial overlapping, it is the partial overlapping 1400 between the first light exit face 1412 of the first protrusion 141 and the second light exit face 1422 of the second protrusion 142. The first light exit face 1412 of the first protrusion 141, the second light exit face 1422 of the second protrusion 142, and the partial overlapping 1400 therebetween are shown in the automotive lighting system 1 of FIG. 3. As depicted in FIG. 3, the first light exit face 1412 of the first protrusion 141 has an upper boundary at point a and a lower boundary at point c, while the second light exit face 1422 of the second protrusion 142 has an upper boundary at point b and a lower boundary at point d, wherein the segment between points b and c acts as the partial overlapping 1400.

Additionally, the partial overlapping 1400, as mentioned above, between the first light exit face 1412 of the first protrusion 141 and the second light exit face 1422 of the second protrusion 142 may be configured in such a way that the second lens 13 projects light from the first and second sub light sources 111, 112 on the road in front of the vehicle as a light pattern with a first maximum light intensity $I_{max1}$, a second maximum light intensity $I_{max2}$, and a minimum light intensity $I_{min}$ between the first maximum light intensity $I_{max1}$ and the second maximum light intensity $I_{max2}$, where $I_{min}/I_{max1}>90\%$ and $I_{min}/I_{max2}>90\%$, leading to a uniform distribution of light intensity across the final light pattern. Details about the final light pattern as projected by the automotive lighting system in front of the vehicle will be explained in the following with reference to FIG. 4, where an example simulated result in the distribution of light intensity for the final light pattern are illustrated according to an embodiment of the present invention.

In some embodiments, at least one of the first light entrance face of the first protrusion and the second light entrance face of the second protrusion comprises a flat face perpendicular to an optical axis of the automotive lighting system. In other words, the first protrusion and/or the second protrusion are provided with a flat light entrance face perpendicular to the optical axis of the automotive lighting system. This may help to keep the distance between each protrusion and its respective sub light source to be constant and relatively small across the light entrance surface of the first lens, thus being beneficial for providing a high efficiency of light in-coupling across the whole light entrance surface of the first lens.

Figure 4:
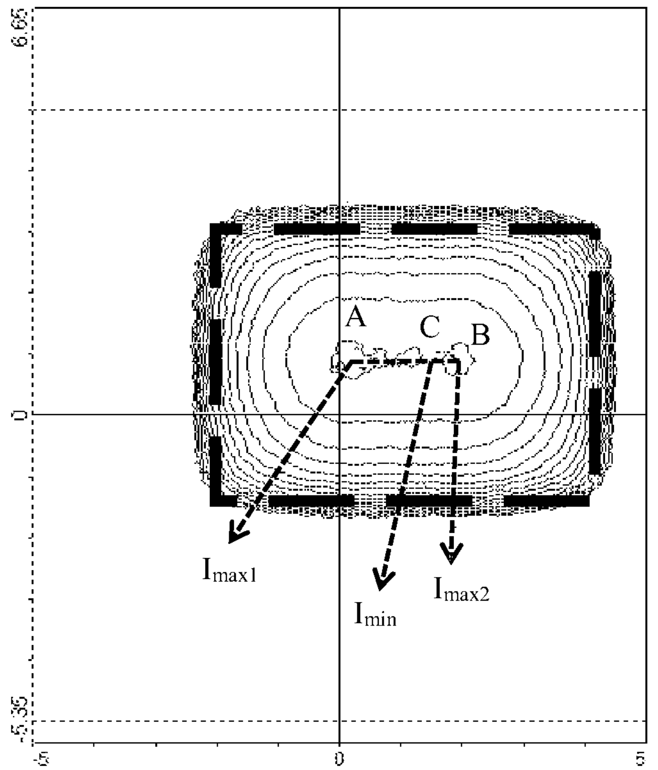
FIG. 4 is an image showing the final light pattern as projected by the second lens from the first and second sub light sources.

FIG. 4 is an image showing the final light pattern as projected by the second lens 13 from the first and second sub light sources 11, 112. As can be seen in FIG. 4, the final light pattern as projected by the second lens 13 from the first and second sub light sources 111, 112 comprises a first maximum light intensity $I_{max1}$ and a second maximum light intensity $I_{max2}$, located respectively at points A and B. Further, in the final light pattern of FIG. 4, especially on a connecting line between the first and second maximum light intensity $I_{max1}$, $I_{max2}$, there is also a minimum light intensity $I_{min}$, located at point C, where $I_{min}/I_{max1}>90\%$ and $I_{min}/I_{max2}>90\%$. From the perspective of generation, the final light pattern, as shown in FIG. 4 and generated, for example, by the automotive lighting system 1 of FIG. 3, is a superposition result between two sub light patterns, which two sub light patterns are projected by the second lens 13 from the first sub light source 111 and the second sub light source 112, respectively, and comprise their own centers in light intensity located around points A and B respectively.

As described above, a special overlapping is introduced between the first light exit face 1412 of the first protrusion 141 and the second light exit face 1422 of the second protrusion 142 so as to obtain an uniform superposition result between the two sub light patterns, leading to the final light pattern having two peaks $I_{max1}$, $I_{max2}$ of light intensity around centers of the two sub light patterns and also a minimum light intensity $I_{min}$ between the two peaks $I_{max1}$, $I_{max2}$, which minimum light intensity $I_{min}$ is also larger than 90 percent of each peak $I_{max1}$, $I_{max2}$. This may help to ensure that the final light pattern as projected by the automotive lighting system 1 in front of the vehicle is uniformly distributed in light intensity, and furthermore gaps that would otherwise exist between the two sub light patterns from the two sub light sources can be nicely closed. This perfect uniform distribution of light intensity in the final light pattern can be expressed as well by a special relationship between an average light intensity $I_{ave}$ within the pattern contour of the final light pattern (indicated for example by a dashed rectangle in FIG. 4) and the two peaks $I_{max1}$, $I_{max2}$ of light intensity as mentioned above, for example by $I_{ave}/I_{max1}>0.4$ and lave/$I_{max2}>0.4$.

In some embodiments, the partial overlapping 1400 between the first light exit face 1412 of the first protrusion 141 and the second light exit face 1422 of the second protrusion 142 is less than half of the first light exit face 1412 of the first protrusion 141 and also less than half of the second light exit face 1422 of the second protrusion 142. In this way, the difference between the first or second maximum light intensity $I_{max1}$, $I_{max2}$ and the minimum light intensity $I_{min}$ may be greatly reduced, helping to provide the final light pattern projected by the automotive lighting system 1 in front of the vehicle with an even more uniform distribution of light intensity.

Figure 10:
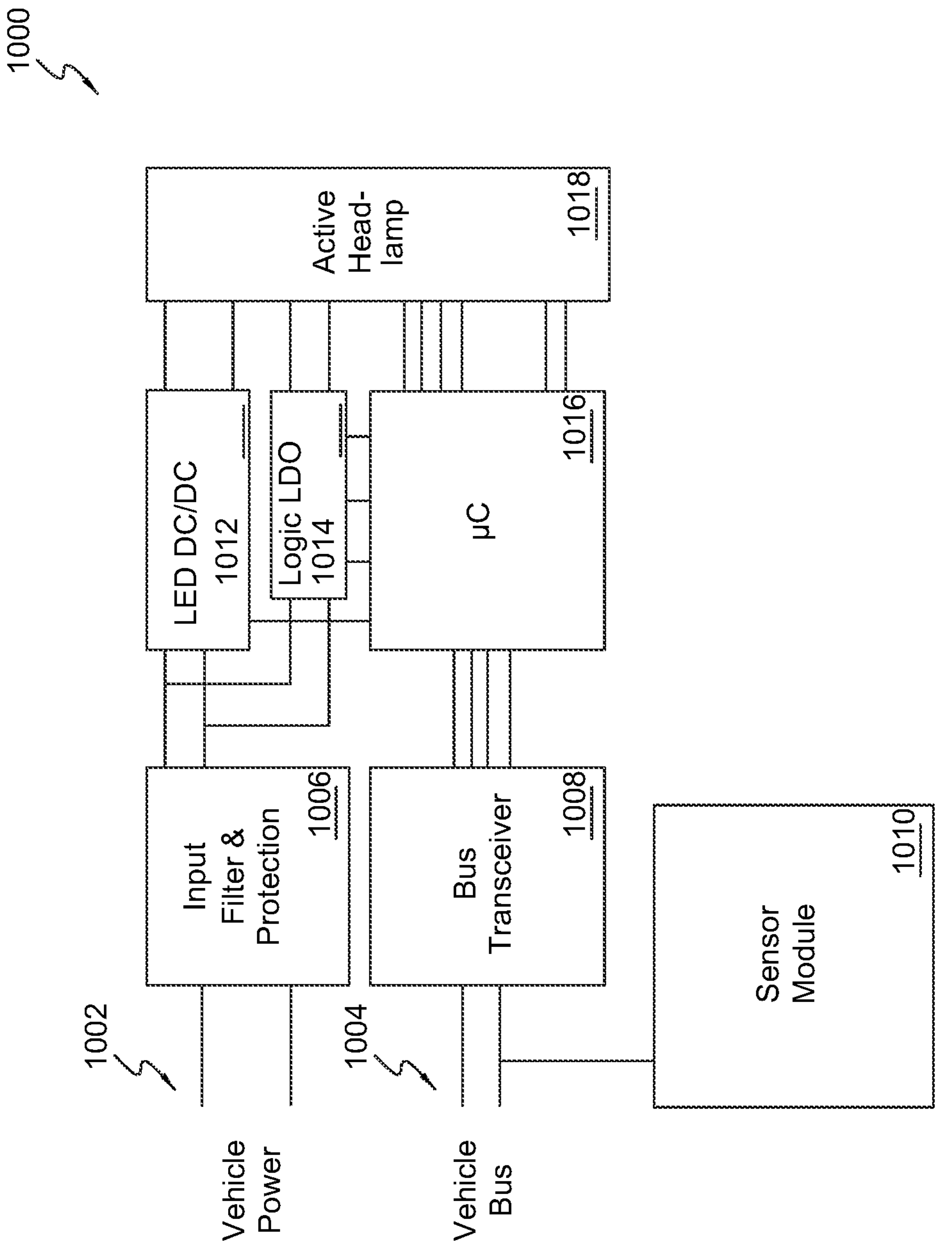
FIG. 10 is a diagram of an example vehicle headlamp system that may incorporate the LED lighting system of FIG. 1, 2 or 3.

FIG. 10 is a diagram of an example vehicle headlamp system 1000 that may incorporate the LED lighting system of FIG. 1, 2 or 3. The example vehicle headlamp system 1000 illustrated in FIG. 10 includes power lines 1002, a data bus 1004, an input filter and protection module 1006, a bus transceiver 1008, a sensor module 1010, an LED direct current to direct current (DC/DC) module 1012, a logic low-dropout (LDO) module 1014, a micro-controller 1016 and an active head lamp 1018. In embodiments, the active head lamp 1018 may include an LED lighting system, such as the LED lighting system of FIG. 1, 2, or 3.

The power lines 1002 may have inputs that receive power from a vehicle, and the data bus 1004 may have inputs/outputs over which data may be exchanged between the vehicle and the vehicle headlamp system 1000. For example, the vehicle headlamp system 1000 may receive instructions from other locations in the vehicle, such as instructions to turn on turn signaling or turn on headlamps, and may send feedback to other locations in the vehicle if desired. The sensor module 1010 may be communicatively coupled to the data bus 1004 and may provide additional data to the vehicle headlamp system 1000 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 1000. In FIG. 10, the headlamp controller may be a micro-controller, such as micro-controller (pc) 1016. The micro-controller 1016 may be communicatively coupled to the data bus 1004.

The input filter and protection module 1006 may be electrically coupled to the power lines 1002 and may, for example, support various filters to reduce conducted emissions and provide power immunity. Additionally, the input filter and protection module 1006 may provide electrostatic discharge (ESD) protection, load-dump protection, alternator field decay protection, and/or reverse polarity protection.

The LED DC/DC module 1012 may be coupled between the filter and protection module 706 and the active headlamp 1018 to receive filtered power and provide a drive current to power LEDs in the LED array in the active headlamp 1018. The LED DC/DC module 1012 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 1014 may be coupled to the input filter and protection module 1006 to receive the filtered power. The logic LDO module 1014 may also be coupled to the micro-controller 1016 and the active headlamp 1018 to provide power to the micro-controller 1014 and/or the silicon backplane (e.g., CMOS logic) in the active headlamp 1018.

The bus transceiver 1008 may have, for example, a universal asynchronous receiver transmitter (UART) or serial peripheral interface (SPI) and may be coupled to the micro-controller 1016. The micro-controller 1016 may translate vehicle input based on, or including, data from the sensor module 1010. The translated vehicle input may include a video signal that is transferrable to an image buffer in the active headlamp module 1018. In addition, the micro-controller 1016 may load default image frames and test for open/short pixels during startup. In embodiments, an SPI interface may load an image buffer in CMOS. Image frames may be full frame, differential or partial frames. Other features of micro-controller 1016 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 11:
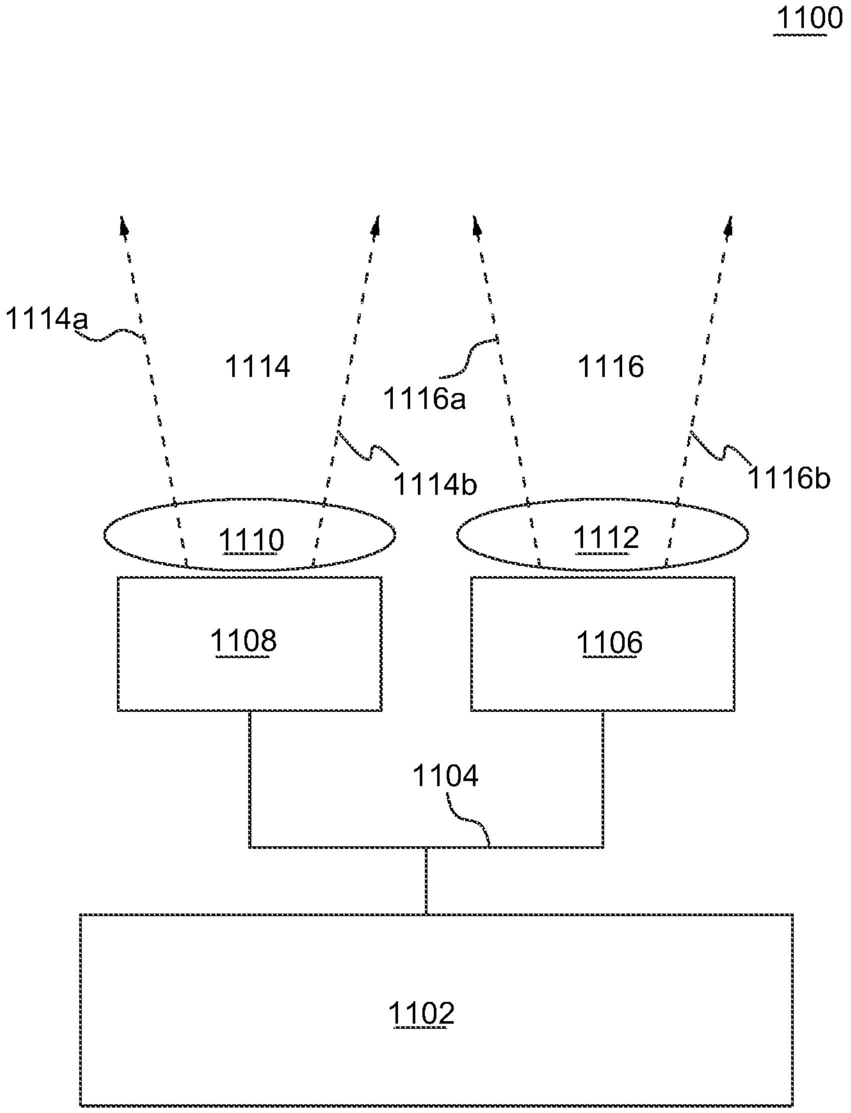
FIG. 11 is a diagram of another example vehicle headlamp system.

FIG. 11 is a diagram of another example vehicle headlamp system 1100. The example vehicle headlamp system 800 illustrated in FIG. 11 includes an application platform 1102, two LED lighting systems 1106 and 1108, and optics 1110 and 1112. The two LED lighting systems 1106 and 1108 may be LED lighting systems, such as the LED lighting system of FIG. 1, 2 or 3, or may include the LED lighting system of FIG. 1, 2 or 3 plus some of all of the other modules in the vehicle headlamp system 1000 of FIG. 10. In the latter embodiment, the LED lighting systems 1106 and 1108 may be vehicle headlamp sub-systems.

The LED lighting system 808 may emit light beams 1114 (shown between arrows 1114*a* and 1114*b* in FIG. 11). The LED lighting system 806 may emit light beams 1116 (shown between arrows 1116*a* and 1116*b* in FIG. 11). In the embodiment shown in FIG. 11, a secondary optic 1110 is adjacent the LED lighting system 1108, and the light emitted from the LED lighting system 1108 passes through the secondary optic 1110. Similarly, a secondary optic 1112 is adjacent the LED lighting system 1106, and the light emitted from the LED lighting system 1106 passes through the secondary optic 1112. In alternative embodiments, no secondary optics 1110/1112 are provided in the vehicle headlamp system.

Where included, the secondary optics 1110/1112 may be or include one or more light guides. The one or more light guides may be edge lit or may have an interior opening that defines an interior edge of the light guide. LED lighting systems 1108 and 1106 (or the active headlamp of a vehicle headlamp sub-system) may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 1102 may provide power and/or data to the LED lighting systems 1106 and/or 1108 via lines 1104, which may include one or more or a portion of the power lines 1002 and the data bus 1004 of FIG. 10. One or more sensors (which may be the sensors in the example vehicle headlamp system 1000 or other additional sensors) may be internal or external to the housing of the application platform 11402. Alternatively, or in addition, as shown in the example vehicle headlamp system 1000 of FIG. 10, each LED lighting system 1108 and 1106 may include its own sensor module, connectivity and control module, power module, and/or LED array.

In embodiments, the vehicle headlamp system 1100 may represent an automobile with steerable light beams where LEDs may be selectively activated to provide steerable light. For example, an array of LEDs (e.g., the LED array 510) may be used to define or project a shape or pattern or illuminate only selected sections of a roadway. In an example embodiment, infrared cameras or detector pixels within LED lighting systems 1106 and 1108 may be sensors (e.g., similar to sensors in the sensor module 1010 of FIG. 10) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. An automotive lighting system for a vehicle, the automotive lighting system comprising:

a light source comprising a first sub light source on a plane and a plurality of second sub light sources on the plane;

a refraction lens comprising a light entrance surface and a light exit surface, the light entrance surface being shaped such that a distance from the light entrance surface to the plane is larger in a peripheral region of the refraction lens than in a central region of the refraction lens, the refraction lens comprising a first protrusion that has a first light entrance face adjacent the first sub light source and a first light exit face on the light entrance surface of the refraction lens, the first protrusion being located in the peripheral region of the light entrance surface of the refraction lens, wherein no protrusions are provided on the light entrance surface of the refraction lens opposite the plurality of second sub light sources in the central region of the refraction lens; and a projection lens.

2. The system of claim 1, wherein the first light exit face of the first protrusion is 1 to 4 times larger than the first light entrance face of the first protrusion.

3. The system of claim 1, wherein:

the refraction lens has a circular contour with an optical axis of the refraction lens passing through the center of the circular contour, and the first protrusion is disposed at a circumference of the circular contour.

4. The system of claim 1, wherein the first light entrance face of the refraction lens is configured to receive light from the first sub light source.

5. The system of claim 1, wherein the projection lens is configured to receive light from the refraction lens and project the received light towards a road in front of the vehicle.

6. The system of claim 1, wherein the first sub light source is located at an off-axis position with respect to the optical axis of the automotive lighting system.

7. The system of claim 1, wherein:

the light entrance surface of the refraction lens is shaped to be convex towards the light source with a center of the refraction lens located at an_optical axis of the automotive lighting system, and in a direction parallel to the optical axis of the automotive lighting system, the first light entrance face of the first protrusion is located at a same position as the center of the light entrance surface of the refraction lens.

* * * * *